J. B. ASTON.
Core-Boxes.

No. 151,342.

Patented May 26, 1874.

WITNESSES.

INVENTOR

John B. Aston,
Alexander Mason
By
Attorneys.

UNITED STATES PATENT OFFICE.

JOHN B. ASTON, OF PITTSBURG, PENNSYLVANIA.

IMPROVEMENT IN CORE-BOXES.

Specification forming part of Letters Patent No. 151,342, dated May 26, 1874; application filed January 12, 1874.

*To all whom it may concern:*

Be it known that I, JOHN B. ASTON, of Pittsburg, in the county of Allegheny and in the State of Pennsylvania, have invented certain new and useful Improvements in Core-Boxes, used in the manufacture of flanged pipe; and do hereby declare that the following is a full, clear, and exact description thereof, reference being had to the accompanying drawings, and to the letters of reference marked thereon, making a part of this specification.

The nature of my invention consists in the construction and arrangement of a core-box for forming the core used to make the face of the flanges in flanged cast-iron pipes, as will be hereinafter more fully set forth.

Figure 1:
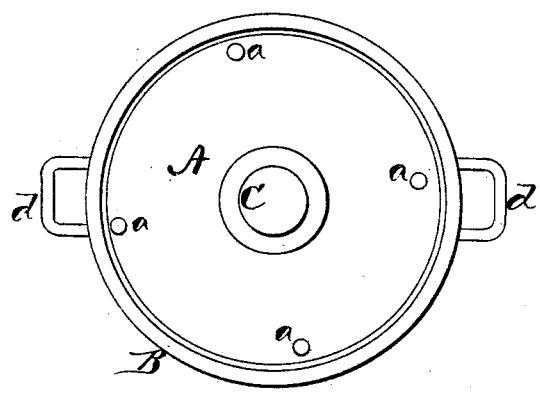
Figure 2:
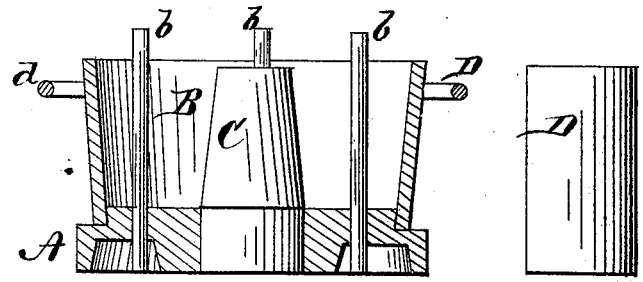

In the accompanying drawing, Figure 1 is a plan view, and Fig. 2 a longitudinal vertical section, of my core-box.

This core-box is formed of a bottom plate, A, the surface of which is faced true in the lathe. The holes $a$ are then spaced off equidistant and drilled through forming seats for the rods $b\ b$. The outside of the core-box is formed by the ring B, provided with handles $d\ d$. This ring rests upon an offset on the upper surface of the plate A, and its interior surface is beveled and finished to correspond with the beveled portion of the flange on the pattern used. In the center of the bottom plate C is a circular aperture for the insertion of the block C, which extends upward as high as the ring B, and has that portion which is above the plate conical or beveled, as shown. This block forms the beveled center-guide for the main core. To form the center of the cores intended to slide over the main core, a block, D, of the same size throughout, is used. This core-box being set together, as shown in Fig. 2, and the rods $b\ b$ placed in their respective seats, the sand is put in and rammed down. The surface is then leveled off, the rods $b\ b$ withdrawn, and a plate is set upon this face. The whole is then turned over, the bottom plate A removed, the center C or D taken out, and the ring B lifted off, leaving the finished core ready to go into the oven and be hardened and dried. A core made in this box insures a perfectly flat surface on the face of the flange.

Having thus fully described my invention, what I claim as new, and desire to secure by Letters Patent, is—

The combination of the bottom plate A having holes $a$, the ring B, rods $b\ b$, and a center block, substantially as and for the purposes herein set forth.

In testimony that I claim the foregoing I have hereunto set my hand this 22d day of December, 1873.

JOHN B. ASTON.

Witnesses:
JOHN B. GEYSER,
JAMES WAGGNER.